UNITED STATES PATENT OFFICE.

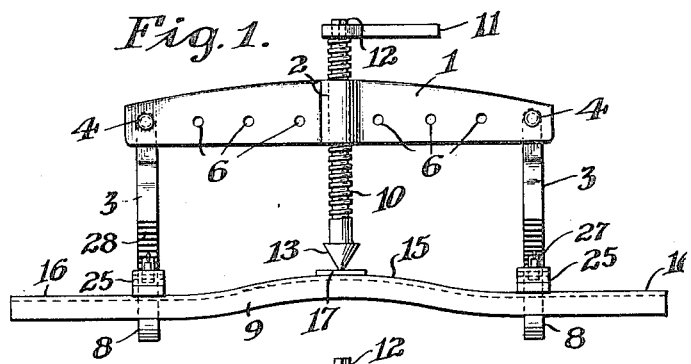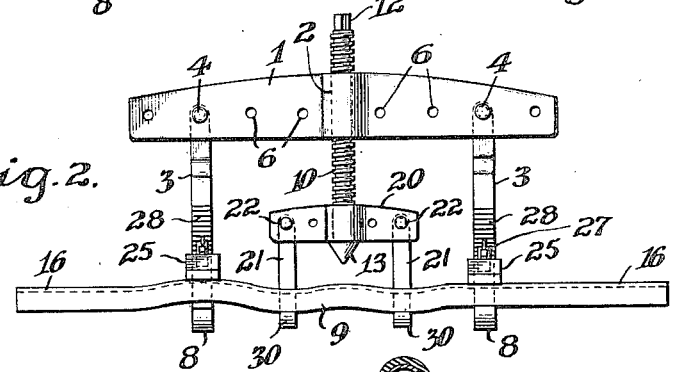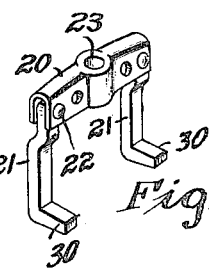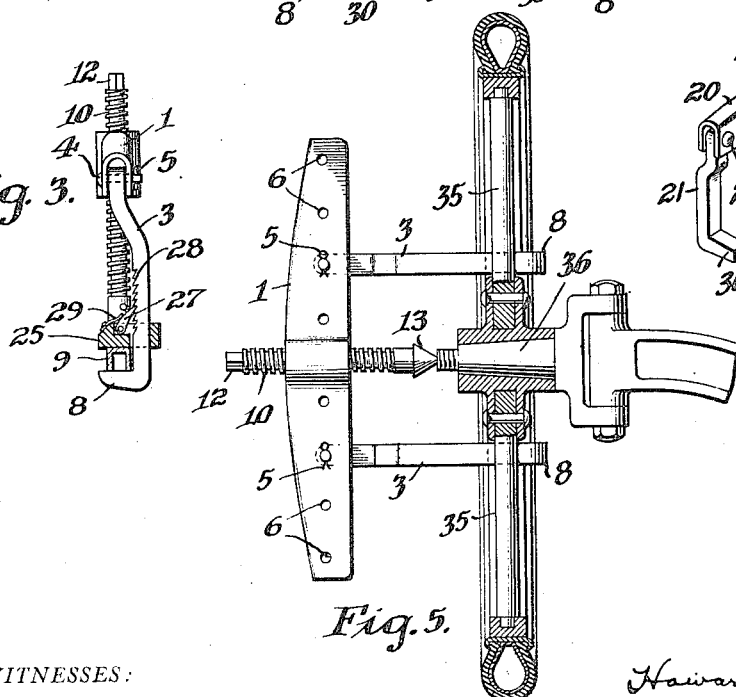

HOWARD W. BORDEN, OF SWARTHMORE, PENNSYLVANIA.

BENDING-MACHINE.

1,041,419.

Specification of Letters Patent.

Patented Oct. 15, 1912.

Application filed February 1, 1910. Serial No. 541,268.

*To all whom it may concern:*

Be it known that I, HOWARD W. BORDEN, a citizen of the United States, residing in Swarthmore, Delaware county, State of Pennsylvania, have invented certain new and useful Improvements in Bending-Machines, of which the following is a specification.

Although I designate the machine or device embodying my invention as a bending machine, I propose to use it, as illustrated in the drawings, for other purposes where power capable of being exerted by my machine is necessary or required.

One of the objects of my invention is to provide a bending machine which is particularly adapted for use in the straightening of automobile parts such as the sides and ends of an underframe. Such a machine in order to be satisfactory and practical must be simple in its construction and also it must be capable of economical construction. It is also desirable that a device for that purpose shall be reasonably light and capable of being shifted from one position to another.

In order that power may be exerted in opposite directions upon the parts of an underframe of an automobile or a similar structure for the purpose of bringing various parts into alinement as desired and so that all of the straightening need not be made from one side or direction alone, I provide a machine or device capable of bending a bar or similar device from two directions.

A further object of my invention is to provide a construction which in addition to its capacity as a bending machine may be also used for the purpose of withdrawing automobile and similar wheels or devices from their journals or other supporting means.

For the purpose of illustrating and demonstrating the principle of my invention, reference may be had to the accompanying drawings forming a part of this specification. It will be understood, however, that many changes in the details of construction may be made within the scope of the specification and claim without departing from my invention.

In the drawings:—Figure 1 is a side elevation of a bending machine or device embodying my invention and showing a channel bar in position to be straightened; Fig. 2 is a similar view of my machine provided with means for straightening a bar, which is shown in position, in the opposite direction; Fig. 3 is an end view of the machine shown in Figs. 1 and 2 with one part which enters into its construction being shown in section; Fig. 4 is a perspective view of one of the parts shown in Fig. 2; and Fig. 5 is a view showing my machine as it is used for withdrawing an automobile wheel from its spindle.

Referring to the drawings:—1 designates a main cross head or body member which preferably though not necessarily, is of channel construction and may be constructed in any suitable manner, as by casting.

3 designates supporting links or members which are adapted to be secured to the cross head 1 by means of bolts 4 which are secured in position by means of cotter pins 5. The cross head or body member 1 is provided with a series of holes 6 for the purpose of permitting adjustment of the supporting links or members 3 along the same. In Fig. 1 it will be noted that the links are secured in the outermost of the said holes while in Fig. 2 the links are shown as having been moved inwardly and in Fig. 5 the links are shown as having been moved still farther inwardly. The links 3 are provided with laterally projecting hooks 8 which are adapted to support a bar 9 which is to be straightened. These hooks or projections 8 are brought into use as abutments when it is desired to straighten the bar outwardly as indicated in Fig. 1.

The means employed for straightening a bar outwardly consists of a screw-threaded member 10 which engages a screw-threaded hole 2 through a solid portion at the center of the cross head or body member 1. The screw-threaded member 10 is turned by means of a lever 11 which is adapted to engage the squared end 12 thereon. Preferably the lower end of the member 10 is cone-shaped as indicated at 13. When it is desired to straigthen a bar or channel member outwardly such member, as 9, is placed upon the supporting projections or stops 8. Thereafter the screw-threaded member is screwed downwardly and exerts a pressure against the said bar or similar member to force it downwardly or outwardly so that the bent up portion, indicated at 15, may be forced outwardly into substantial alinement with the outer end portions 16 of the said bar. To prevent the end of the member 10 from contacting directly with the bar 8, a block 17 may be interposed if desired. It frequently happens that the various parts of a bar, and particularly the side or end members of an underframe such as that used in automobiles, cannot be brought properly into alinement and adjustment without also straightening out certain portions of the sides or ends of the frame in a direction opposite to that shown in Fig. 1. For this purpose I have provided the device shown in Figs. 2 and 4 in which the cross head or member 20 is placed in position upon the member 10 being supported or held thereon by means of the shoulder at the upper end of the cone-shaped head or end 13. The cross head or member 20 is provided with links or arms 21 which are secured by means of bolts 22 to the said member. The links 21 are provided with lateral projections or hooks 30 which are adapted to engage the part to be straightened. These links or arms are adjustable in the same manner as the links or arms 3 are adjustable on the main cross head or body member 1. It will be understood that the hole 23 through the member 20 is large enough to permit the passage of the screw-threaded portion of the member 10 therethrough. The lower end of the said member above the shoulder is left smooth as is indicated.

25 designates stops or abutments which are movably carried or supported upon the links or arms 3. These parts 25 consist of blocks provided with openings through which the links 3 extend. They are movable upon the links 3 for the purpose of varying the width of space between the stops or supporting projections 8 and the said stops 25 for the reception of bars of different thicknesses to be straightened. Upward movement of the blocks 25 is prevented by means of pawls 27 which are held in engagement with the ratchet teeth 28 on the links 3 by means of springs 29.

In the use of the device as illustrated in Fig. 2, the bar to be straightened is placed in position, as indicated, and the projections or hooks 30 placed in engagement therewith. The member 10 is turned so as to move the same upwardly, that is, toward the member 1, and thus exert upward or inward force upon the said bar,—the force exerted by the parts 20 and 21 upon the bar being transmitted to the blocks 25 and the latter being prevented from moving upwardly by reason of the presence of the pawls 27.

In Fig. 5 I have shown my device as it is employed for withdrawing an automobile wheel from its spindle. 35 designates a wheel in position upon its spindle 36. When so employed the projections 8 upon the links 3 are placed over the inner ends of any two of the spokes or any other part of the wheel and the part 10 is screwed downwardly or inwardly against the end of the spindle 36. It is obvious that by so screwing or moving the part 10 the reaction exerted upon the links 3 and the wheel 35 engaged by the hooks on said links causes the withdrawal of the wheel from its spindle.

My invention is susceptible of other uses and applications and I desire to have it understood that it is not limited to the exact construction and uses which are illustrated in the accompanying drawings.

Having thus described my invention, I claim:—

In a device of the character described, the combination of a main cross head or body member, links connected to the said cross head or body member, the said links having resistance blocks movably connected thereto, a member adjustably connected to the said main cross head or body member, and a second cross head secured to the said member and carrying links having hooks or projections formed thereon, the said hooks or projections being adapted to engage a bar and exert pressure thereon to straighten it.

In testimony that I claim the foregoing as my invention, I have hereunto signed my name this 31st day of January, A. D. 1910.

HOWARD W. BORDEN.

In the presence of—
GEO. H. WEIDNER,
CARRIE E. KLEINFELDER.